PROCESS FOR DEVELOPING WOUND COILS FOR ELECTROMAGNETIC

Original Filed April 2, 1969 2 Sheets-Sheet 1

INVENTORS:
Arthur S. Cutler,
Dallas F. Smith,
BY John M. Stoudt
Attorney.

PROCESS FOR DEVELOPING WOUND COILS FOR ELECTROMAGNETIC
Original Filed April 2, 1969 2 Sheets-Sheet 2
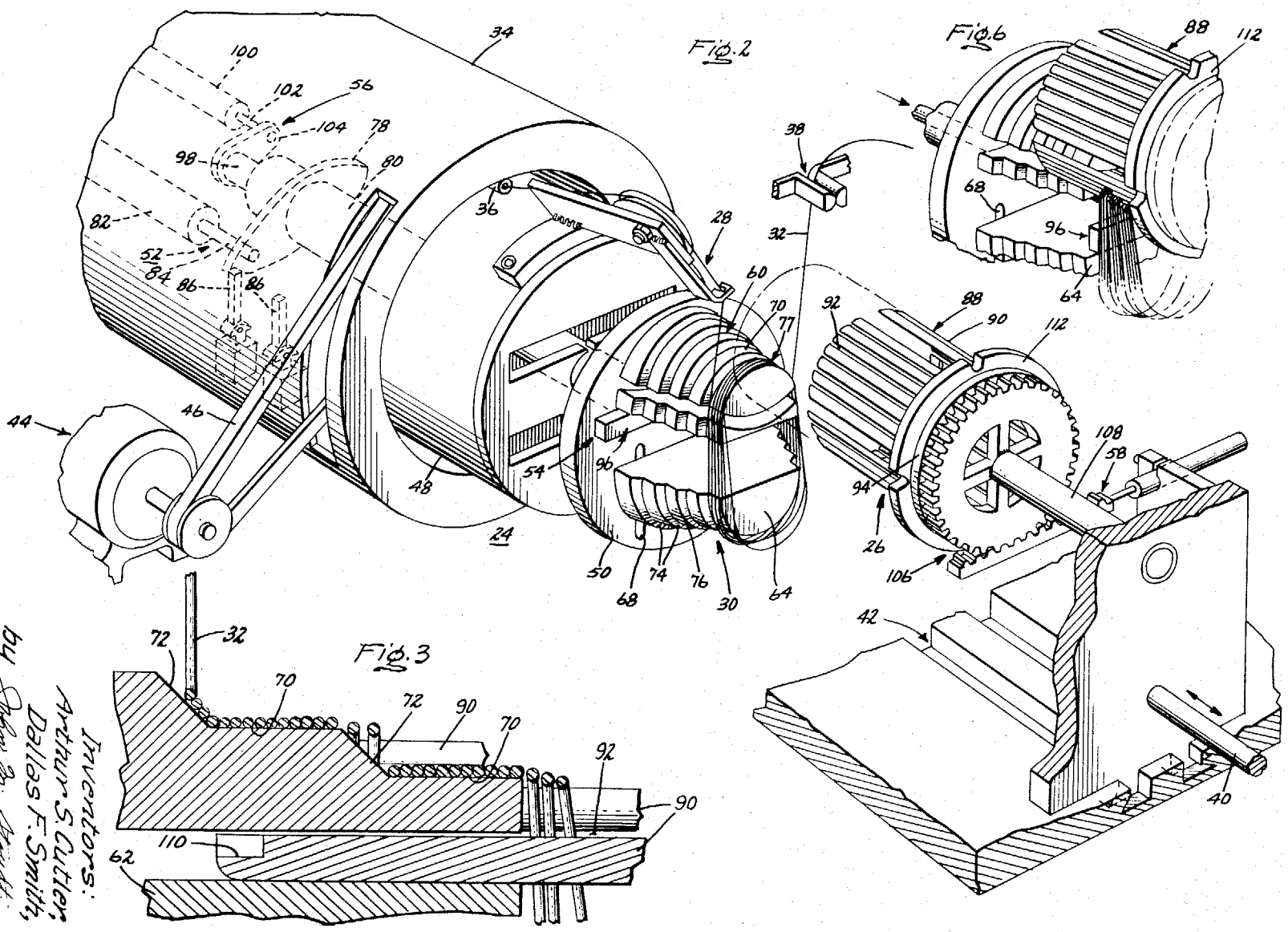
Inventors:
Arthur S. Cutler,
Dallas F. Smith,
by John In. Stoudt
Attorney.

United States Patent Office

Re. 27,415
Reissued June 27, 1972

27,415

PROCESS FOR DEVELOPING WOUND COILS FOR ELECTROMAGNETIC DEVICES

Arthur S. Cutler, Scotia, N.Y., and Dallas F. Smith, Fort Wayne, Ind., assignors to General Electric Company Original No. 3,522,650, dated Aug. 4, 1970, Ser. No. 812,590, Apr. 2, 1969, which is a continuation-in-part of Ser. No. 594,463, Nov. 15, 1966. Application for reissue Dec. 15, 1970, Ser. No. 98,487
Int. Cl. H02k *15/00, 15/14, 15/16*
U.S. Cl. 29—596 16 Claims

Matter enclosed in heavy brackets [ ] appears in the original patent but forms no part of this reissue specification; matter printed in italics indicates the additions made by reissue.

ABSTRACT OF THE DISCLOSURE

Method for developing electrical coil groups formed of a number of coils in a coil group-accommodating member for ultimate transfer into selected slots of a magnetic core. The coil group-accommodating member is supported adjacent a noncollapsible, longitudinally movable coil form in position to receive the coil group. The coils in each coil group are developed by winding turns of a given coil on the noncollapsible form and concurrently moving some of the turns from the form into the accommodating member where the individual coil groups are finally developed. The noncollapsible coil form is periodically moved longitudinally to produce coils of differing spans during the development of each coil group. *Also the coil-receiving or coil group-accommodating means is positioned with its distal end generally in alignment with the distal end of the coil form to receive generated turns. As the turns are generated about the coil form, the last generated turn moves at least the next adjacent previously generated turn toward the distal end of the coil form.*

CROSS-REFERENCE TO RELATED APPLICATION

This is *a reissue of Letters Patent No. 3,522,650 which in turn is* a continuation-in-part of the copending U.S. application Ser. No. 594,463, filed Nov. 15, 1966.

BACKGROUND OF THE INVENTION

This invention relates generally to an improved process for developing wound coils for use in electromagnetic devices. More particularly, the disclosure relates to improved process of forming a plurality of interconnected coil groups into a coil group-receiving assembly for ultimate transfer into a stator core.

The basic method used to insert or inject coils axially into magnetic cores, such as stator cores, is exemplified in the expired U.S. patent to A. P. Adamson, 2,432,267. The apparatus for injecting coils has been continuously improved of course since this method was originally introduced. One such improvement was the well known coil injection machine which enables coils and/or coil groups to be placed axially in the slots of stator cores.

Since the coil injection machine is not a winding machine, the coils used therewith must somehow be wound into appropriate coil groups and loaded into the machine prior to injection of the coils into certain slots of the stator cores. In one approach, coils of a particular coil group are wound on a collapsible arbor type of winding machine, often with coil groups wound all in one direction in a pole-by-pole fashion. In this kind of machine, after the coil group has been wound on the arbor, the arbor is collapsed into a smaller cross-sectional configuration to permit removal of the coils individually from the machine. These coils are then inserted into slots of the core by the coil insertion machine. Prior approaches included one or more of the following which detract from the efficient and economical development of coils with consistent quality and tend to limit the satisfactory production of the coil injection procedure: collapsing type arbor winding machines; removal of the coils from the machine by an operation such as by hand; unusually long wire connections between coil groups and polarity of the groups, among others.

SUMMARY OF THE INVENTION

Accordingly, it is a general object of this invention to provide an improved process of developing wound coils for electromagnetic devices.

Another more specific object of the invention is the provision of a method for developing interconnected coil groups in coil-placing machines for subsequent insertion into a magnetic core.

Another object of the present invention is to provide a novel method for developing wound coil groups into a transfer device for subsequent loading of the coil groups into the tooling section of a coil injection type machine.

Another object of the present invention is to provide a novel method of developing wound coil groups into a transfer device for subsequent loading of the coil groups into the tooling section of a coil injection machine, the method being capable of eliminating any manual handling of the coil groups during the entire developing and loading procedure.

In carrying out the method of our invention in one form, we provide a novel process for developing wound electrical coils carried by an electrical induction or electromagnetic device, such as a motor stator. In the illustrated exemplification, a length of electrically conductive insulated wire is wound on a longitudinally movable, noncollapsible coil form while a coil group-accommodating member, for instance, a coil group-receiving assembly in the form of a transfer magazine, is disposed on a rotatable holding means in the path of travel of the coil form. A first coil group comprising a plurality of serially connected different size coils is formed on the coil form as the individual coils are wound on the form. While being wound on the form, at least some of the turns of each coil are initially crowded off the form into the coil group-accommodating member, and then the remaining turns are transferred therein. A second coil group, serially interconnected by a continuous strand of wire to the first coil group, is then formed on the coil form and transferred or loaded into the coil group-accommodating member, the member being indexed or rotated to receive this second coil group. This procedure is repeated as desired until a predetermined number of coil groups are formed and loaded in the member. The coil groups are then inserted into another coil group-accommodating member, for instance, the tooling section of a coil injection machine, as by removing the first member from its support and placing it in coil-transferring position on the tooling section of the coil injection machine.

Our method of developing wound coils in the tooling section of a coil injection machine is not only efficient and economical to practice, but also achieves well-formed coils which ultimately result in high quality electromagnetic devices. The method further is readily adaptable to the mass production of such devices, while permitting a more effective utilization of coil injecting equipment.

BRIEF DESCRIPTION OF THE DRAWINGS

The subject matter which we regard as our invention is particularly pointed out and distinctly claimed in the concluding portion of the specification. The invention it- ıIf, however, together with further objects and advan-ıges thereof, may be best understood by reference to the ıllowing description taken in conjunction with the :companying drawings in which:

FIGS. 2 and 6 are partial perspective views illustrating ıe preferred method for practicing our invention in one ›rm;

FIG. 3 is an enlarged partial vertical sectional view ıowing a portion of the coil form and coil group-accom-odating member, a transfer magazine in the exemplifi-ıtion, illustrating the manner in which coils are formed . groups in connection with the coil-accommodating .ember;

DESCRIPTION OF THE PREFERRED EMBODIMENTS

Figure 1:
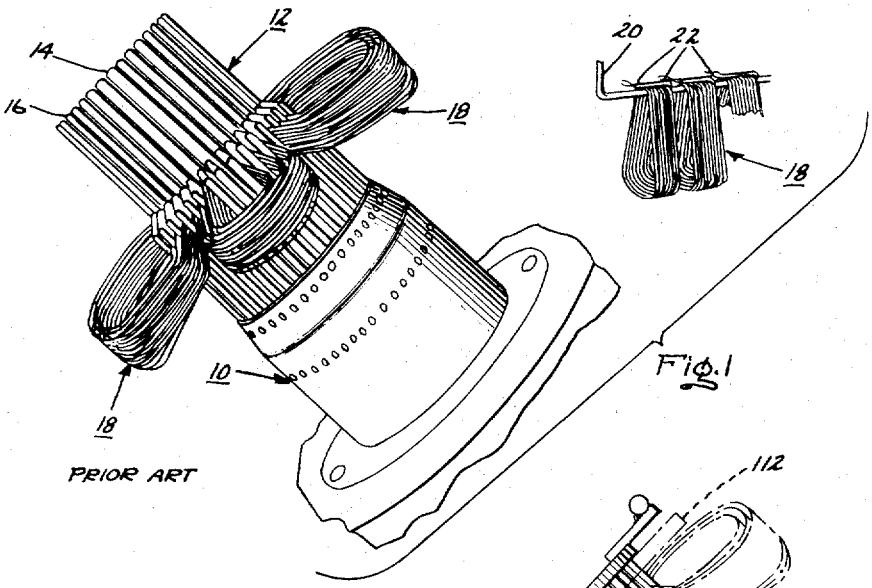
FIG. 1 is a partial perspective view of a conventional ›il injection machine of the type presently in use, desig-ıted as "Prior Art," showing the tooling section thereof ıd illustrating the manner in which it is loaded with ›il groups preparatory to the insertion of the groups into ıe electromagnetic device, such as a stator in the illus-ated exemplification.

Having more specific reference now to FIG. 1, we ıve illustrated therein a coil injection machine 10 of a pe well known in the art, which has evolved from the damson invention set out in the above mentioned pat-ıt, 2,432,267. The coil injection machine 10 includes a ›oling section 12 having a plurality of upstanding blades 1 mounted in equally spaced apart relation in order to ›rm a plurality of slots 16 therebetween and forming generally cylindrical outer periphery. The configuration : the blades 14 permits a stator core to be supported on e tooling section 12 in accordance with the usual oper-ion of the coil injection machine 10.

One well known manner of loading the tooling sec-›n 12 of the coil injection machine 10 is to hand-load ›il groups 18 therein. The coil groups 18 may be nor-ally supported on a supporting means 20 adjacent the ›il injection tooling section 12 in order to provide ready :cess thereto, enabling the operator to take the coil 'oup from the supporting means 20, release the fastening ip or tape 22, and then proceed to manually locate the ›il group in the tooling section 12. The coil groups 18 ıve been conventionally wound on a collapsing arbor pe winding machine (not illustrated) in order to pro-de distributed, level or single layer wound concentric ›ils necessary for use with the coil injection machine ). However, since the coil groups are manually han-ed after removal from the winding arbor, the level ›und configuration is often lost notwithstanding the use : the tapes or clips 22. Accordingly, it is often difficult ›r the operator to mount the coil groups in the tooling ction 12, since the slots 16 are normally only wide ıough to receive a single thickness of wire. Further-ore, the individual coils of each group of coils are ›und in the same direction and hence alternate groups : coils must be reversed by the operator during load-g of the tooling section 12. Other suggested procedures, nong other problems, tend to form unnecessarily long ›-called interpole connections, i.e., wire connecting dif-rent coil groups together in circuit, when the connec-›ns are made unitary (of the same continuous length of ire as the individual coil groups).

In order to provide a more efficient arrangement for ›ading the tooling section 12 of a coil injection machine and for producing adjacent coil groups of different polarities, integrally interconnected with relatively short, unitary interpole connections, we have provided the machine illustrated in FIG. 2 and generally denoted by reference numeral 24. We have illustrated in FIG. 2, for example, various aspects of one form of our invention in connection with a coil group-receiving assembly in the form of a four-pole transfer magazine 26 which is adapted to mate with the tooling section 12 of a conventional four-pole coil injection machine. As shown in FIG. 2, a winding flyer generally denoted by reference numeral 28 is utilized to wind about a stepped noncollapsing coil form 30 a plurality of distributed, level wound concentric coils of different size from a continuous length of electrically conductive insulated wire 32. The wire is normally withdrawn from a wire source (not illustrated) running through the machine housing 34 in the wire tube 36, then into the winding flyer 28.

In order to wind the wire 32 about the coil form 30, the end of the wire is initially clamped in a suitable clamping means shown schematically at 38. After the wire 32 is clamped, the transfer magazine 26 is moved forwardly in the track 42 by suitable means 40 until it is in the position illustrated in FIG. 2 in phantom lines. The moving means 40 may be, for example, the piston of an air cylinder. When the magazine 26 is forward, it is immediately adjacent the forward end of the coil form 30 and is located in position to receive coil turns therefrom.

A plurality of serially connected, level wound concentric coils of different size are generated or sequentially placed on the coil form 30 by the winding flyer 28 as the winding flyer 28 rotates about the coil form 30. The winding flyer 28 is rotated by any standard reversible motor 44 which is connected by the belt 46 to a rotatable barrel 48 upon which the flyer 28 is mounted. The rotatable barrel 48 also supports the wire tube 36 and is mounted within the housing 34 for rotation with respect thereto. The coil form 30 is maintained stationary with respect to the rotatable barrel 48 in order to enable the turns of wire to be placed on the coil form 30, the coil form 30 being mounted on the nonrotatable mounting plate 50.

The concentric, different size coils comprising a coil group 18 are formed as the flyer 28 rotates about the form 30 by a stepping mechanism 52 which periodically moves the coil form 30 forwardly in the direction of the transfer magazine 26. This movement of the coil form sequentially locates the steps or coil-forming stations of the coil form in position to receive turns from the flyer. As the turns of wire are wound about the coil form, at least several turns of each coil are initially crowded off the form into the transfer magazine 26.

When a complete coil group 18 is formed upon the coil form 30, the flyer motion ceases and the remaining turns in the entire coil group 18 are moved off the form into the transfer magazine 26 by a stripper means 54 operative by a stripper actuating means 56. The coil form 30 is then withdrawn by the mechanism 52 to its initial position, and the transfer magazine is indexed or rotated by the indexing mechanism 58 in order to enable another coil group to be loaded therein.

A second oppositely wound coil group 18 is then formed from a continuous strand of wire on the coil form as the winding flyer 28 is rotated about the coil form 30 in a reverse direction by the motor 44, and the coil form 30 is again periodically stepped forwardly by the stepping mechanism 52. As the second group of coils is formed from the continuous strand of wire 32, it therefore is serially connected to the first group of coils. The turns of the second group of coils are moved from the coil form 30 into the transfer magazine 26 in the same manner as the first group, and the above procedure is repeated until a desired number of coil groups are formed and loaded in the transfer magazine 26.

Figure 4:
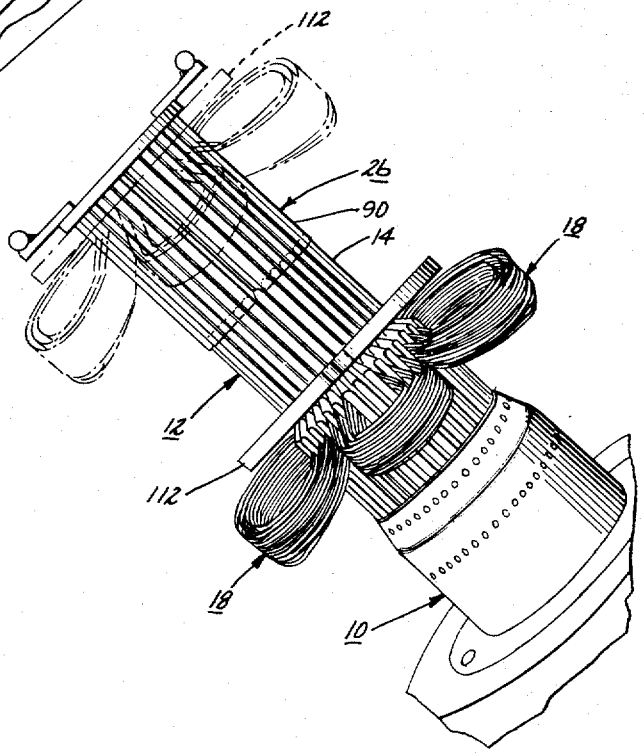
FIG. 4 is a partial perspective view illustrating the anner in which coil groups are transferred from the ›il-accommodating member or coil-receiving assembly to yet another coil-accommodating member in the form : the coil injection tooling section of the coil injection .achine.

When the transfer magazine is fully loaded, it is removed from the machine 24 and may then be mounted on another coil group-accommodating member in the form of the tooling section 12 of a coil injection machine 10 (FIG. 4), and the serially connected coil groups are inserted directly into the tooling section 12. The empty magazine 26 is then removed from the tooling section 12, and a stator core 60 (FIG. 5) positioned on the tooling section and the coil groups are axially inserted into the coil-receiving slots [66] *122* of the stator by the coil injection machine. The empty transfer magazine 26 may then be positioned on the machine 24 in order to have another set of coil groups developed therein.

There are several important advantages of the present invention, including the fact that the coil groups are not manually handled during the entire process of developing the coil groups in the transfer magazine 26 and loading them in the tooling section 12 of the coil injection machine 10. Also, the turns are placed into a coil group-receiving assembly without need for a collapsible type winding form. These factors dramatically reduce the possibility of damaging the wire insulation or of disturbing the level winding of the coils while insuring short interconnections between coil groups. In addition, the coils of the group are developed and maintained in proper relationship for direct transfer into the coil injection machine, i.e., adjacent coil groups are oppositely wound to provide adjacent poles of alternating polarity.

In order to more fully explain how the above method may be carried out in actual practice, we will now more fully describe the specific features of one type of machine 24 which may be used in the practice of the method as shown in FIGS. 2 and 3. Initially, it will be observed that the stepped coil form 30 includes a first or upper portion 60, an intermediate portion 62 and a second or lower portion 64, each of which is mounted in cantilever fashion on the plate 50 and extends forwardly therefrom. The upper and intermediate portions 60 and 62 are fixedly mounted to the plate, defining therebetween an arcuate slot 66. The lower coil form portion 64, however, is adjustably mounted on the plate 50, the plate including an elongate slot 68 which enables the lower portion 64 to be vertically adjusted (as viewed in the drawings) with respect to the upper portion 60. This allows different size coils to be formed on the coil form 30, thereby enabling the machine 24 to be used for developing coils in stator cores of varying stack height.

If desired, the individual turn lengths in a given coil could readily be varied merely by progressively changing the relative locations of the first and second portions during the generation of the turns for the given coil. For instance, second portion 64 may be attached to plate 50 such that it could be moved gradually toward or away from the portion 60 by a screw type feed. By controlling speed and direction of the feed and by providing shortened steps so turns are fed rapidly into the coil-receiving assembly, the turns could be progressively shortened, lengthened, or changed in length as desired in the same coil as the turns are being generated.

The upper coils form portion 60 includes a plurality of vertically displaced arcuate sections or steps 70 each of which has a common center of curvature which is substantially perpendicular to the plate 50. Thus, it will be appreciated that the arcuate steps 70 are all generally horizontal (as viewed in the illustrated embodiment). The arcuate steps or sections 70 are joined by inclined arcuate sections 72. The lower coil form portion 64 also includes a plurality of vertically displaced arcuate sections or steps 74, joined, as are the upper steps 70, by inclined arcuate sections 76. Corresponding pairs of upper and lower arcuate steps 70 and 74 are of equal length, and together with corresponding pairs of upper and lower inclined arcuate sections 72 and 76 define a plurality of coil-forming stations 77 which are of increasing size from the forward end of the coil form 30 rearwardly. The intermediate coil form portion 62 includes stepped sides comprising a part of each coil-forming station 77. Although for convenience in manufacture, the arcuate outer surfaces are made generally solid, they could, of course, be formed by components, such as pins or parts having axial slots to furnish interruptions in the surfaces.

We have provided the stepping mechanism 52 in order to sequentially locate the coil-forming stations 77 in turn-receiving position under the winding flyer 28. The mechanism 52 includes an elongate hollow supporting tube 80 having the mounting plate 50 fixed to the front end thereof. A yoke plate 78 is mounted at the rear end of the tube 80 and a double action air cylinder 82 has its piston 84 engaged with the yoke plate 78 in order to provide a constant force against the yoke plate 78. A plurality of solenoid actuated stops 86 extend into the path of the yoke plate 78 and prevent the cylinder 82 from moving it forwardly. The supporting tube 80 and the coil form 30 mounted thereon are moved forwardly in steps as the stops 86 are sequentially withdrawn allowing the air cylinder 82 to force the yoke plate 78 forwardly.

It should be noted that the stops 86 are spaced in order to sequentially locate the upper and lower inclined arcuate sections 72 and 76 of each coil-forming station in the winding path of the winding flyer 28. This has been done to provide a means for forming level wound coils without the necessity of moving the coil form continuously in the manner of known prior art devices. Thus, as the winding flyer 28 rotates about the coil form 30 to form a coil at each station, the wire 32 is placed about the upper and lower inclined arcuate sections 72 and 76, whereby succeeding turns of wire force preceding turns of wire force preceding turns of wire forwardly onto the arcuate sections 70 and 74. In addition, each lower arcuate section 74 is preferably slightly inclined to enable the coils formed about each coil-forming section to slip therefrom as the succeeding turns force the preceding turns forwardly. In actual practice, it has been found for best results to have the common centers of curvature of the lower arcuate sections 74 intersect the plate 60 at an angle of approximately 85 degrees and intersecting the common center of curvature of the upper arcuate sections 70 at an angle of approximately 5 degrees. This (along with the fact that succeeding turns force preceding turns forwardly) enables some of the coil turns to be initially crowded off the form 30 into the magazine 26 while each coil is being wound.

The coil-accommodating member, transfer magazine 26, of the exemplification is constructed with a plurality of coil-receiving means therein for accommodating four coil groups. The magazine 26 includes a mounting plate 94 upon which is mounted a cage 88 including a plurality of longitudinally extending spaced apart blades 90 defining a plurality of elongate slots 92 therebetween. The blades 90 are mounted about the mounting plate 94 giving the cage 88 a generally cylindrical shape, corresponding to the shape of the arcuate slot 66 between the upper and intermediate coil form portions 60 and 62. The shape of the cage 88 permits the coil form 30 and the cage 88 to telescope, as shown in FIG. 3, as the coil form 30 is stepped forwardly by the stepping mechanism 52. Thus, as will be seen in FIG. 3, several of the blades 90 move into the arcuate slot 66 as the coil form and the magazine move in relation to one another, and the individual coils formed upon the various coil-forming stations 77 of the coil form 30 each move into opposed slots 92 of the magazine cage 88. If the coil group-receiving assembly is the tooling section which receives the turns directly from form 30, that section and form should include this relationship. Furthermore, as explained above, the succeeding turns of the wire 32 force preceding turns forwardly on the coil form 30 and the coil formed at each coil-forming station 77 moves at least partially into its respective magazine slots 92 as it is wound. In addition, to insure that each of the coils is moved from the coil form fully into the nagazine cage slots 92, the aforementioned coil stripper 4 is provided.

The coil stripper 54 includes a stripper head 96 mounted n the forward end of an elongate stripper rod 98 which xtends through the supporting tube 80. The stripper ctuating means 56 includes an air cylinder 100 having ts piston 102 connected to a laterally extending yoke plate 04 mounted on the stripper rod 98. After a desired num- er of coils are formed on the coil from 30, and the coil orm 30 and the magazine cage 88 are in telescoping en- agement, the air cylinder 100 is actuated in order to move he stripper head 96 forwardly between the upper and ower coil form portions 60 and 64 thereby forcing the oils from the coil form 30 fully into the magazine cage 8.

After a first set of coils is moved by the stripper head 6 into the magazine cage 88, the air cylinder 82 is ctuated to withdraw its piston 84 and hence move the upporting tube 80, the supporting plate 50 and the coil orm 30 back to its initial position. At the same time, the ransfer magazine 26 is indexed or rotated by any suit- ble means, such as the rack and pinion arrangement 106 n the magazine-supporting arbor 108. The magazine is otated through a preselected angle to locate empty maga- ine slots 92 in the proper coil-receiving position adjacent he coil form. As stated above, the flyer 28 is then rotated n the opposite direction by the reversible motor 44 in rder to form a second coil group of opposite polarity on he coil form 30.

When the transfer magazine 26 is fully loaded with a redetermined number of coil groups, it is removed from ts supported position on the arbor 108. The transfer nagazine 26 which is illustrated in the exemplification is four-pole transfer magazine, i.e., a magazine adapted to ave developed therein four serially connected wound coil roups. It will be appreciated, however, that magazines hich are particularly adapted to two-pole, six-pole or reater configuration may be loaded with coil groups by he machine 24. After being removed from the arbor 108, he loaded magazine 26 is mounted upon the tooling sec- ion 12 of a coil injection machine in order to transfer the oils developed therein in the machine 24 into the tooling ection 12. In this regard, each blade 90 of the magazine age includes a notch 110 therein, forming a seat for mat- ng the magazine cage 88 with the coil injection tooling ection 12. Thus, when the cage 88 is seated on the tooling ection 12, each blade 90 is in radial and axial overlapping elation with a blade of the coil injection tooling section 2. In addition, a magazine stripper 112 is mounted in the nagazine cage 88 behind the coils developed therein. The tripper is useful for pushing the coils from the transfer nagazine cage 88 directly into cooling section 12 of the oil injection machine 10. The coils will readily slide from he cage 88 into the tooling section 12 as the slots 92 are ligned with the slots 16 when the magazine 26 is correctly nounted on the coil injection machine. That is to say, the nagazine slots 92 are in complementary relation with the lots 16 to form continuous passageways for accommodat- ng the coil sides. In addition, the overlapped blades form ositive guide means for facilitating transfer of the coil roups from the magazine slots 92 into the slots 16.

Figure 5:
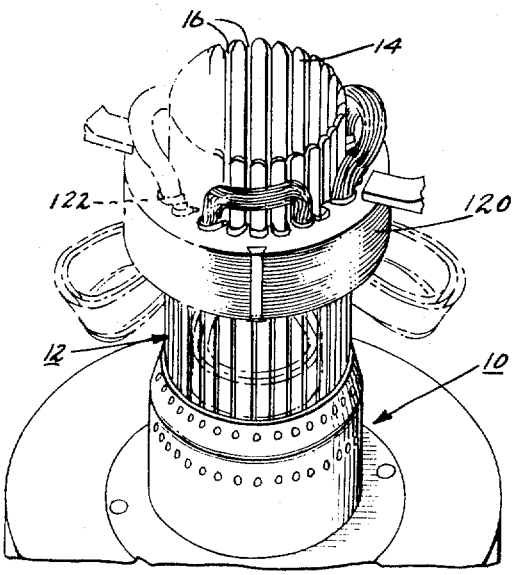
FIG. 5 is a partial perspective view illustrating the anner in which the coil groups are injected axially into ıe coil-receiving slots of a stator core.

Referring finally to FIG. 5, it will be seen that after the oil groups forming a complete stator winding having been oaded in the tooling section 12 of the coil injection nachine 10 in accordance with one aspect of our inven- ion, a stator core 120 is mounted on the tooling section 2, and the coil groups are subsequently injected axially nto the coil-receiving slots 122 thereof in order to install he wound coils in the core.

From the foregoing description of the method exempli- ying our invention, it will be apparent that we have rovided an efficient and economical operation for devel- oping wound coils for electrical induction devices. In ddition, it will be realized that the present invention is xtremely versatile in nature and can be conveniently used in connection with a variety of winding types, core stack heights, wire sizes, and coil injection equipment. Furthermore, while we have disclosed the invention in connection with an axial type coil injection machine, and the invention is particularly advantageous to use with this type machine, it will be appreciated that the invention could also have application with other types of coil injection equipment.

While in accordance with the patent statutes, we have described what at present is considered to be the preferred embodiments of our invention, it will be obvious to those skilled in the art that numerous changes and modifications may be made therein without departing from the invention, and it is therefore aimed in the appended claims to cover all such equivalent variations as fall within the true spirit and scope of the invention.

What we claim as new and desire to secure by Letters Patent of the United States is:

1. A method of developing a coil group in a coil group-accommodating means of a first coil-accommodating member for transfer of the coil group to a second coil-accommodating member of a coil injection machine, the coil group including a plurality of serially connected wound coils having a number of turns, the method comprising the steps of: supporting the coil group-accommodating means of the first member adjacent the coil form in position to receive the coil group; producing the plurality of serially connected coils to provide the coil group on a stepped coil form and concurrently moving at least some of the turns of each wound coil into the coil group-accommodating means; and removing the remaining turns of each coil from the coil form while placing said remaining turns in the coil group-accommodating member thereby developing the coil group therein.

2. The method of claim 1 including the additional steps of locating additional coil group-accommodating means adjacent the coil form in position to receive a second coil grup; producing on the coil form from a continuous strand of wire a second, oppositely wound plurality of serially connected coils to provide a second coil group; and removing the second coil group from the coil form to place the second coil group in the first coil-accommodating member.

3. The method of claim 1 wherein the step of concurrently moving some of the turns of each coil into the coil group-accommodating means includes placing the turns of each wound coil on inclined portions of the stepped coil form and thereby crowding said some turns of each coil wound off the form into the coil group-accommodating means.

4. A method of loading a distributed wound coil group including at least two serially connected electrical coils into the tooling section of a machine for injecting the wound coil group into an electromagnetic device having coil-receiving slots, the method comprising the steps of: winding the distributed wound coil group about a non-collapsing coil form having at least two different size coil forming stations; supporting a transfer magazine adjacent the coil form as the coil group is being wound, the transfer magazine having slot means for separately supporting the different size coils wound about the coil form; moving the group of coils from the coil-forming stations until they are fully supported within the slot means of the transfer magazine; mounting the loaded transfer magazine on the tooling section of a coil injection machine; and moving the wound coil group from the transfer magazine into the tooling section of the coil injection machine for subsequent injection thereof into the electromagnetic device.

5. A method of loading at least two serially connected coil groups each including at least two serially connected electrical coils into the tooling section of a machine for injecting the wound coil group into an electromagnetic device having coil-receiving slots, the method comprising the steps of: winding a group of serially connected different size coils about a noncollapsing coil form having at least two different size coil-forming stations; supporting a transfer magazine adjacent the coil form, the transfer magazine having at least two sets of slot means for separately supporting the different size coils wound about the coil form; moving at least part of the groups of coils from the coil-forming stations into the first set of slot means of the transfer magazine as the at least two different size coils are being wound; winding another group of serially connected coils about the coil-forming stations of the coil form from a continuous strand of wire; moving the another group of coils into the second set of slot means of the transfer magazine; mounting the transfer magazine loaded with the two groups of serially connected coils on the tooling section of a coil injection machine; and moving the two wound coil groups from the transfer magazine into the tooling section of the coil injection machine for subsequent injection thereof into the coil-receiving slots of an electromagnetic core.

6. The method of claim 5 including, after moving the group of coils from the coil-forming stations into the first set of slot means of the transfer magazine, the additional step of indexing the transfer magazine until the second set of slot means is located adjacent the coil form; and prior to moving each group of coils from the coil-forming stations into the first and second sets of slot means of the transfer magazine, the additional step of moving the coil form axially into telescoping engagement with a portion of the transfer magazine to facilitate moving the coil groups therein.

7. A method of developing in a coil-receiving assembly at least one coil group comprising a predetermined number of serially connected coils of electrically conductive wire, said method comprising the steps of: winding a first coil of wire comprising a predetermined number of turns about a first step of a coil form having a plurality of increasingly larger steps; moving the coil form transversely across the winding path to sequentially locate the remaining steps of the coil form into position to receive turns of wire; winding coils of wire each comprising a predetermined number of turns on the remaining steps of the coil form, wherein each coil is larger than the preceding coil; locating a coil-receiving assembly in the path of travel of said coil form, the coil-receiving assembly having means associated with each step of the coil form to receive each wound coil; initially crowding at least several turns of each coil into the associated receiving means as each said coil is being wound; and after the predetermined number of coils are formed, moving the coils fully into the associated receiving means.

8. The method of claim 7 wherein a plurality of coil groups are developed in the coil-receiving assembly by withdrawing the coil form transversely across the winding path after the predetermined number of coils have been moved into their associated receiving means; thereafter indexing the coil-receiving assembly to locate additional receiving means in the path of travel of said coil form; and then winding turns on each step of the coil form while moving the coil form transversely across the winding path to locate each step in turn-receiving position and thereby forming a second coil group; and moving the second coil group into the additional receiving means.

9. The method of claim 7 wherein the step of initially crowding at least several turns of each coil into its associated receiving means includes winding the turns of wire on an inclined portion of each step of the coil form whereby succeeding turns force preceding turns forwardly along the coil form steps.

*10. A method of developing at least one coil group having a plurality of serially connected wound coils of different sizes, each being formed from a number of turns of wire, for use in an electromagnetic device, in a coil-receiving assembly, the method comprising the steps of: supporting the coil-receiving assembly next to a stepped coil form in position to receive the at least one coil group; producing the plurality of serially connected wound coils of different sizes of at least one coil group by generating turns about a stepped coil form and concurrently moving at least some of the turns of the respective wound coils temporarily into the coil-receiving assembly as additional turns are being generated about the stepped coil form in the same coil group; and subsequently transferring the at least one coil group out of the coil-receiving assembly.*

*11. The method of developing at least one coil group as set forth in claim 10 wherein the stepped coil form has a distal end and the step of producing the plurality of serially connected wound coils of different sizes by generating turns about a stepped coil form and concurrently moving at least some of the turns of each wound coil temporarily into the coil-receiving assembly includes the moving at least some of the turns of each coil toward the distal end as the additional turns are being generated about the stepped coil form.*

*12. A method as set forth in claim 10 wherein turns for different coils of the at least one coil group are successively generated about different axial portions of the coil form; and providing relative axial movement of the coil form and coil-receiving assembly between the turn generation of the successive coils so that at least some of the previously generated turns for each coil are moved into different slots of the coil-receiving assembly as subsequent turns for the respective coils of the at least one coil group are generated.*

*13. The method of developing at least two coil groups each having a plurality of serially connected coils, formed of electrically conductive wire, for use in an electromagnetic device in a coil-accommodating member, the method comprising the steps of: generating a number of turns of wire about a plurality of steps of a coil form to provide a plurality of separated coils of a first coil group and moving the turns into a first set of separated slots of a coil-accommodating member, with the coil form and the first set of separated slots being supported in a first adjacent aligned relative position to facilitate transfer of the turns directly into the first set of separated slots which maintain the turns as a plurality of serially connected and separated coils of a first coil group; indexing the coil form and coil-accommodating member relative to one another, so that a second set of separated slots are supported in a second adjacent aligned relative position with the coil form while the plurality of serially connected and separated coils are retained in the first set of separated slots; and generating another number of turns of wire about the plurality of steps of the same coil form to provide a plurality of separated coils of a second coil group and moving the another number of turns into the second set of separated slots of a coil-accommodating member, with the same coil form and the second set of separated slots being supported in the second adjacent aligned relative position to facilitate transfer of the another number of turns directly into the second set of separated slots which maintain the another number of turns as a plurality of serially connected and separated coils of a second coil group in angularly spaced relation with respect to the first coil group.*

*14. The method of claim 13 in which the steps of generating a number of turns of wire about a plurality of steps of a coil form, and moving the turns into a first set of separated slots includes successively generating turns about different axial portions of the coil form and providing periodic relative axial movement between the coil-accommodating member and each step of the coil form to place the desired separated slots of the first set in the desired alignment with a preselected step of the coil form for receiving turns of a serially connected coil in the first coil group.*

*15. The method of developing at least two coil groups for use in an electromagnetic device in a coil-receiving assembly having at least two sets of separated slots to*

*ccommodate temporarily the at least two coil groups, he method comprising the steps of: disposing one set f separated slots of the coil-receiving assembly in a upported position adjacent a coil form to receive coil urns of a first coil group; winding a number of turns of ire about a coil form while concurrently moving at least ome of the turns into the one set of separated slots; disosing another set of separated slots of the coil-receiving ssembly in the supported position adjacent the coil orm to receive coil turns of a second coil group in anguarly spaced relation to the first coil group; and winding number of turns of wire about the coil form while conurrently moving at least some of the turns into the nother set of separated slots to produce the second coil roup in the coil-receiving assembly.*

*16. The method of claim 15 in which the first and econd coil groups are thereafter transferred from the oil-receiving assembly for use in the electromagnetic evice.*

References Cited

The following references, cited by the Examiner, are of record in the patented file of this patent or the original patent.

UNITED STATES PATENTS

| | | | |
|---|---|---|---|
| 3,508,316 | 4/1970 | Hill | 29—205 |
| 2,836,204 | 5/1958 | Mason | 29—205 X |
| 3,036,603 | 5/1962 | Moore | 140—92.1 |
| 3,324,536 | 6/1967 | Hill | 29—205 |
| 3,415,292 | 12/1968 | Ericson | 140—92.1 |
| 2,934,099 | 4/1960 | Mason | 140—92.1 |
| 2,847,171 | 8/1958 | Keesee | 242—82 |
| 2,929,179 | 3/1960 | George | 242—82 X |
| 3,331,403 | 7/1967 | De Young | 140—92.1 X |

JOHN F. CAMPBELL, Primary Examiner

C. E. HALL, Assistant Examiner

U.S. Cl. X.R.

29—605, 606; 140—92.1; 242—7.09, 82